UNITED STATES PATENT OFFICE.

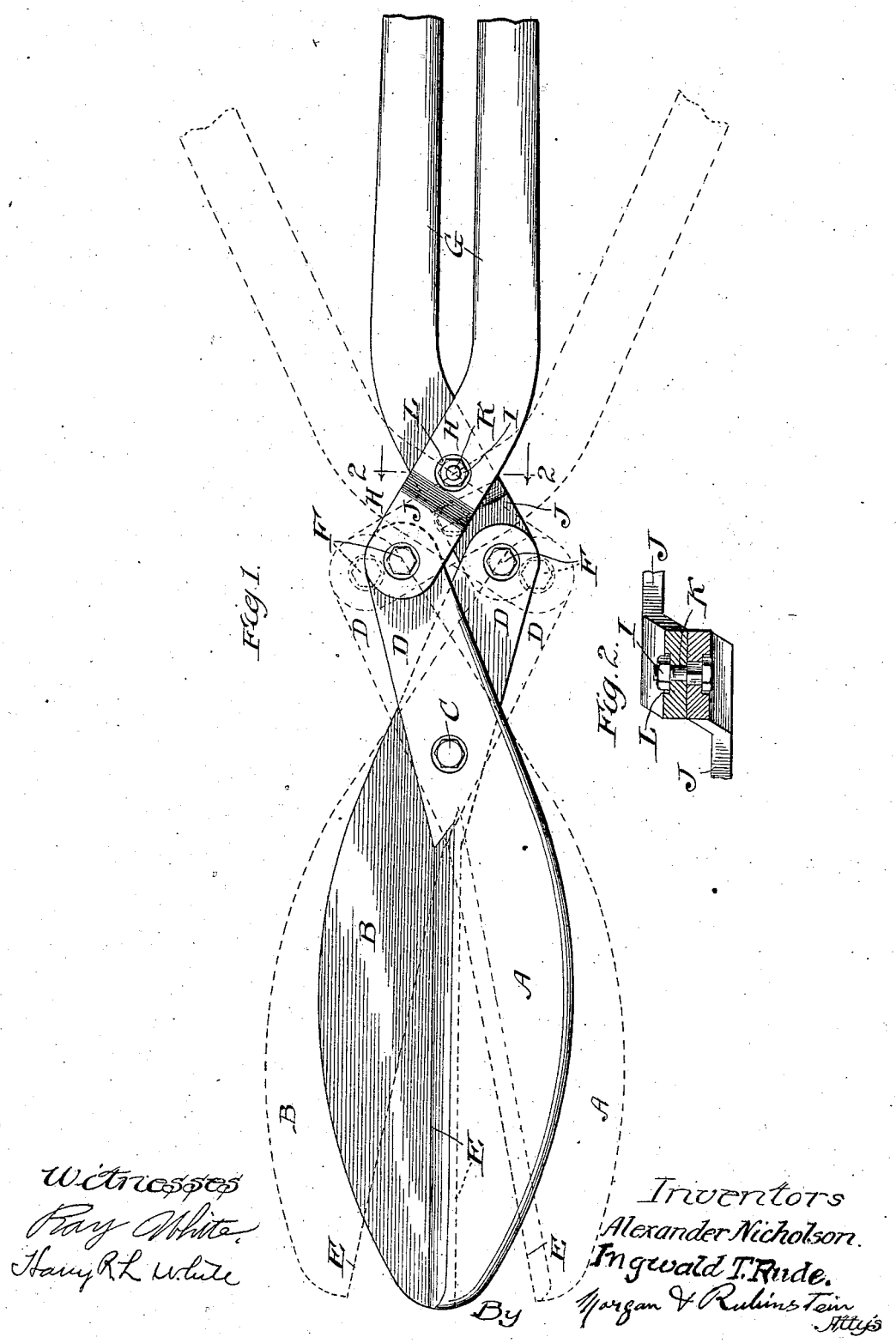

ALEXANDER NICHOLSON AND INGWALD T. RUDE, OF CHICAGO, ILLINOIS.

HAND-SHEARS.

No. 884,410.　　　　Specification of Letters Patent.　　　Patented April 14, 1908.

Application filed July 20, 1907. Serial No. 384,772.

*To all whom it may concern:*

Be it known that we, ALEXANDER NICHOLSON and INGWALD T. RUDE, citizens of the United States, residing at Chicago, in the county of Cook and State of Illinois, have invented a new and useful Improvement in Hand-Shears, of which the following is a specification.

The object of our invention is to provide a pair of hand shears for cutting sheet metal and other material by which a much greater thickness of material can be cut by the same or by less pressure than is applied by hand to the ordinary shears of the same size, and thus enlarge the range of usefulness of this class of shears.

The manner in which we accomplish our object is described in the following specifications and illustrated in the accompanying drawings in which:

Figure 1 is a vertical elevation, the solid lines showing the parts in the closed position and the dotted figure showing the parts in the open position. The handles being broken off, the thumb and finger loops not being shown. Fig. 2 is a section on the line 2—2 Fig. 1.

In the drawings A indicates the lower and B the upper jaws of the shears which are secured together by the pivot bolt C in the ordinary way. From this pivoted point the cutting part of the jaws are of the usual construction, but the rear ends D are quite short and cross each other at an angle with the line of the cutting edges E. Each of these ends has pivot holes for the pivot bolts F. The handles G are parallel when the shears are closed, but the ends H cross each other at an angle with the parallel lines of the main parts of the handles. These ends H are flattened and pivotally secured together by the pivot bolt I. The ends J are shouldered and have pivot holes and are thereby adapted to fit outside the ends D of the jaws and to be pivotally secured thereto by the pivots F. All the pivot holes K are recessed at L, as shown in Fig. 2, for the heads and nuts of the bolts.

The pivotal connection of the handles with the jaws herein described in the drawings forms a toggle joint of great power.

What we claim and seek to secure by Letters Patent is:

A pair of hand shears consisting of a pair of cutting members pivotally secured together, the rear ends of said members forming vertical angles with the cutting edges thereof, said ends crossing each other and having a pivot hole, and a pair of handles pivotally secured together near the ends thereof, said ends forming vertical angles to the parallel lines of said handles, said ends crossing each other and having pivot holes corresponding with said pivot holes in said cutting members and being shouldered to fit the outside of said members and thereby adapted to be pivotally connected thereto; and pivot bolts extending through said holes in said members and handles whereby said handles and members are pivotally secured together as described.

ALEXANDER NICHOLSON.
　　　　INGWALD T. RUDE.

Witnesses:
　THOMAS J. MORGAN,
　JOSEPH STAAB.